US009347775B2

(12) United States Patent
Casinovi et al.

(10) Patent No.: US 9,347,775 B2
(45) Date of Patent: May 24, 2016

(54) METHOD AND APPARATUS FOR SELF-CALIBRATION OF GYROSCOPES

(71) Applicants: Giorgio Casinovi, Atlanta, GA (US); Farrokh Ayazi, Atlanta, GA (US); Wang Kyung Sung, Atlanta, GA (US); Milap Jayesh Dalal, Morganville, PA (US); Arashk Norouz Pour Shirazi, Atlanta, GA (US)

(72) Inventors: Giorgio Casinovi, Atlanta, GA (US); Farrokh Ayazi, Atlanta, GA (US); Wang Kyung Sung, Atlanta, GA (US); Milap Jayesh Dalal, Morganville, PA (US); Arashk Norouz Pour Shirazi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 44 days.

(21) Appl. No.: 14/180,748

(22) Filed: Feb. 14, 2014

(65) Prior Publication Data

US 2014/0157896 A1 Jun. 12, 2014

Related U.S. Application Data

(63) Continuation of application No. 13/444,413, filed on Apr. 11, 2012, now Pat. No. 8,763,441.

(60) Provisional application No. 61/562,662, filed on Nov. 22, 2011.

(51) Int. Cl.
*G01P 21/00* (2006.01)
*G01C 19/56* (2012.01)
*G01C 19/5776* (2012.01)
*G01C 25/00* (2006.01)

(52) U.S. Cl.
CPC ............ *G01C 19/56* (2013.01); *G01C 19/5776* (2013.01); *G01C 25/005* (2013.01)

(58) Field of Classification Search
None
See application file for complete search history.

(56) References Cited

U.S. PATENT DOCUMENTS

| 3,512,876 | A | * | 5/1970 | Marks | G02F 1/172 359/296 |
|---|---|---|---|---|---|
| 8,011,246 | B2 | | 9/2011 | Stewart | |
| 2007/0034006 | A1 | * | 2/2007 | Stewart | 73/504.13 |
| 2008/0264168 | A1 | | 10/2008 | Stewart | |
| 2009/0031831 | A1 | * | 2/2009 | Stewart | 74/5.6 D |
| 2009/0173157 | A1 | | 7/2009 | Stewart | |
| 2010/0058861 | A1 | * | 3/2010 | Kuang et al. | 73/504.12 |
| 2010/0063763 | A1 | | 3/2010 | Rozelle | |

* cited by examiner

*Primary Examiner* — Robert R Raevis
(74) *Attorney, Agent, or Firm* — Burns & Levinson LLP; Bruce D. Jobse

(57) ABSTRACT

A gyroscope having a resonant body utilizes a self-calibration mechanism that does not require physical rotation of the resonant body. Instead, interface circuitry applies a rotating electrostatic field to first and second drive electrodes simultaneously to excite both the drive and sense resonance modes of the gyroscope. When drive electrodes associated with both the drive and sense resonance modes of the gyroscope are excited by forces of equal amplitude but 90° phase difference, respectively, the phase shift in the gyroscope response, as measured by the current output of the sense electrodes for each resonance mode, is proportional to an equivalent gyroscope rotation rate.

8 Claims, 4 Drawing Sheets

METHOD AND APPARATUS FOR SELF-CALIBRATION OF GYROSCOPES

CROSS-REFERENCE TO RELATED APPLICATIONS

This application is a continuation of co-pending U.S. patent application Ser. No. 13/444,413, filed on Apr. 11, 2012, which claims priority to U.S. Provisional Patent Application Ser. No. 61/562,662 filed on Nov. 22, 2011, entitled Electrostatic Self Calibration of Gyroscopes, the subject matter of which is incorporated herein by this reference for all purposes.

STATEMENT REGARDING FEDERALLY SPONSORED RESEARCH OR DEVELOPMENT

The subject matter disclosed herein was made partially with U.S. Government support from DARPA under contract W31P4Q-12-1-0004. The U.S. Government may have certain rights in the invention.

FIELD OF THE INVENTION

The present disclosure relates to gyroscopes, and, more specifically, to techniques for calibrating a gyroscope without having to physically rotate the gyroscope during the calibration process.

BACKGROUND OF THE INVENTION

On-chip self-calibration of a gyroscope is a valuable feature that can eliminate expensive and time consuming mechanical calibration of the device using rate tables and address any long term drift of its scale factor. In recent years a number of self-test and self-calibration techniques for gyroscopes and accelerometers have appeared in the literature. A common feature to those techniques is the incorporation of a mobile platform of some sort (e.g. a rotary stage) in the sensor die to perform the calibration. With such systems, the gyroscope is physically rotated and the typical readout architecture relies on signal amplitude to measure the rotation rate of the device. With such readout schemes, only one of two resonance modes of the device is electrically excited. The Coriolis force caused by a rotation around the gyroscope axis creates a coupling between the two modes, so that the amplitude of the second resonance mode—which is used as the sense signal—is proportional to the angular velocity of rotation $\Omega_z$. Unfortunately, rotary stages add to the complexity and cost of a gyroscope.

Accordingly, a need exists for a system and technique in which a gyroscope, accelerometer, or other device may be self-calibrated without the need to physically rotate the device in order to determine an angular velocity of rotation for calibration purposes.

SUMMARY OF THE INVENTION

The present disclosure is directed towards systems and techniques for self-calibration of Coriolis-based vibratory gyroscopes that do not require the use of any additional moving parts or a calibration stage. Instead, the effect of the Coriolis force on the device is mimicked by the application of a rotating electrical excitation to the device drive and sense modes simultaneously. Such rotating excitation, which can be created by a rotating electrostatic field applied to the device drive electrodes simultaneously, can be substituted for physical rotation for calibration purposes.

Disclosed herein is a gyroscope having a resonant body that utilizes a self-calibration mechanism that does not require physical rotation of the resonant body. Instead, the interface circuitry applies a rotating (i.e. a periodically modulated) electrostatic field to first and second drive electrodes simultaneously to excite both the drive and sense resonance modes of the gyroscope. A vibratory gyroscope has two resonance modes that are approximately equal in frequencies, which are typically called the drive and sense resonance modes. When drive electrodes associated with both the drive and sense resonance modes of the gyroscope are excited by forces of equal amplitude but 90° phase difference, respectively, the phase shift in the gyroscope response, as measured by the current output of the sense electrodes for each resonance mode, is proportional to an equivalent gyroscope rotation rate.

According to a disclosed system and technique, when the drive and sense resonance modes of the gyroscope are both excited by forces of equal amplitude and 90° phase difference, the phase shift in the gyroscope response is proportional to an equivalent gyroscope rotation rate. This technique may be utilized with different gyroscope implementations, including, but not limited to high-frequency bulk acoustic wave (BAW) disk gyroscope, and low-frequency flexural mode gyroscopes like the ring gyroscope or the mode-matched tuning fork gyroscope ($M^2$-TFG). The disclosed self-calibration method utilizes a sensor readout architecture in which both the sense and drive modes of the gyroscope are excited at the same time, which differs from currently used readout schemes, in which only the drive mode is excited.

According to one aspect of the disclosure, a gyroscope apparatus comprises: a resonator body; first and second drive electrodes coupled to the resonator body; and interface circuitry for driving the first drive electrode and second drive electrode simultaneously. In one embodiment, first and second drive electrodes are capacitively coupled to the resonator body, and interface circuitry further comprises circuitry for providing a first drive signal to the first drive electrode and circuitry for providing a second drive signal to the second drive electrode. In various embodiments, the first drive signal and the second drive signal have the same amplitude and/or a different phase. In another embodiment, a 90° phase difference exists between the second drive signal and the first drive signal.

According to another aspect of the disclosure, a gyroscope apparatus comprises: a resonator body; and a self-calibration mechanism that does not physically rotate the resonator body. In one embodiment, the self-calibration mechanism comprises drive circuitry for applying a rotating electrostatic field to the first drive electrode and second drive electrode simultaneously.

According to another aspect of the disclosure, a method of calibrating a gyroscope comprises: A) providing a gyroscope comprising a resonator body having a plurality of drive electrodes coupled thereto; and B) determining an equivalent rate of gyroscope rotation other than by physically rotating the gyroscope. In one embodiment, B) comprises applying a rotating electrostatic field to the drive electrodes simultaneously.

According to yet another aspect of the disclosure, a method of calibrating a gyroscope comprises: A) providing a gyroscope having first and second resonance modes of operation; B) exciting both the first and second resonance modes simultaneously; and C) determining an equivalent rate of gyroscope rotation from a response of the gyroscope caused by the excitation of both the first and second resonance modes simultaneously. In the various embodiments, B) comprises simultaneously providing to first and second drive electrodes of the gyroscope a signal of either equal amplitude and/or different phase. In another embodiment, B) comprises applying a rotating electrostatic field to the drive electrodes simultaneously. In another embodiment, C) comprises determining an equivalent rate of gyroscope rotation from a phase difference between signal outputs of first and second sensor electrodes of the gyroscope.

The needs set forth herein as well as further and other needs and advantages are addressed by the present embodiments, which illustrate solutions and advantages described below. Various embodiments of the system and method are described in detail below and are also part of the present teachings.

BRIEF DESCRIPTION OF THE DRAWINGS

The present disclosure is illustratively shown and described in reference to the accompanying drawing in which.

DETAILED DESCRIPTION

Figure 1:
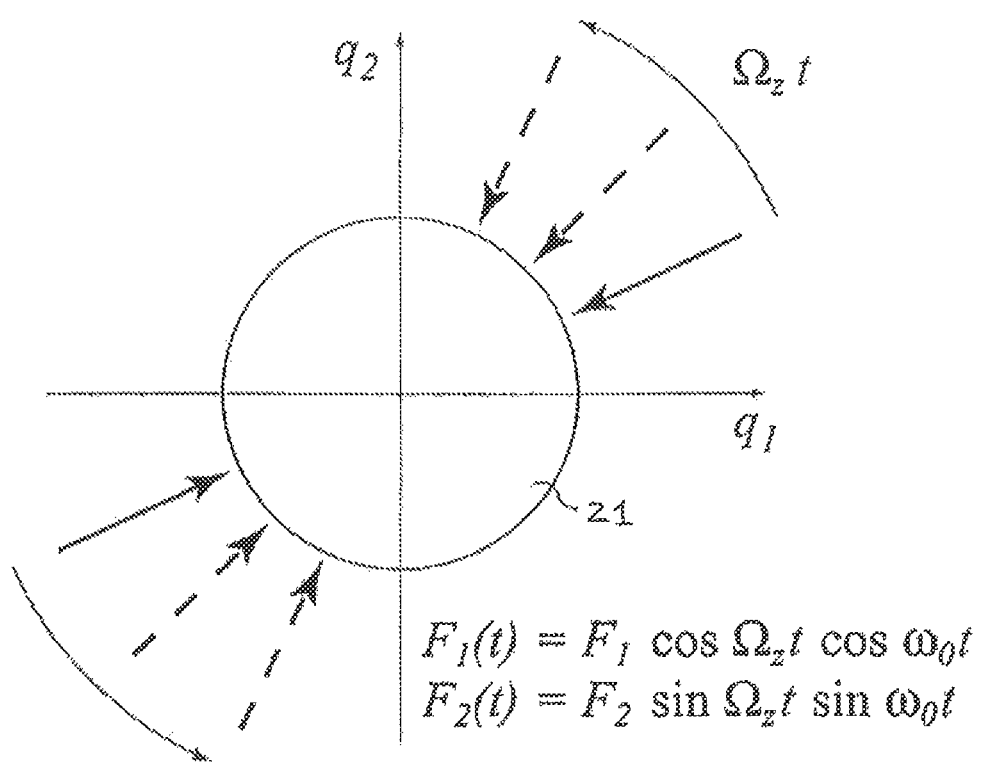
FIG. 1 illustrates conceptually a gyroscope in which the direction of applied excitation rotates the gyroscope at an angular velocity equivalent to applying amplitude-modulated excitations in the direction of the coordinate axes, according to the present disclosure.

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

The systems and techniques described herein are directed towards calibrating a gyroscope without having to physically rotate the gyroscope during the calibration process. Disclosed herein is a new system and method of measuring the gyroscope rotation rate based on signal phase instead of signal amplitude. In the disclosed system, the drive and sense resonance modes are both excited by forces that are of equal amplitude but 90° out of phase. The Coriolis force induces a phase shift in the responses of the two resonance modes of the gyroscope. For sufficiently small rotation rates, the phase shift is proportional to the angular velocity of rotation $\Omega_z$.

The self-calibration system and technique disclosed herein is based on the analysis of an equivalent 2-DOF mass-spring model of vibratory gyroscopes. The analysis that follows compares a gyroscope response caused by rotation to the gyroscope response caused by a rotating excitation force when the gyroscope remains stationary in an inertial reference system.

Theoretical Analysis

Assume first that a mode-matched gyroscope (i.e. $f_{drive}=f_{sense}=\omega_0/2\pi$) rotates around its z-axis (the sensitive axis) at a constant angular velocity $\Omega_z$ with respect to a fixed inertial frame of reference. Excitations that are 90° out of phase are applied to the two resonance modes of the device. Then the behavior of the gyroscope, modeled by its equivalent 2-DOF mass-spring system, is described by the following equations:

$$\ddot{q}_1 + \frac{\omega_0}{Q}\dot{q}_1 - 2\lambda\Omega_z\dot{q}_2 + \omega_0^2 q_1 = F_1\cos\omega_0 t \quad (A)$$

$$\ddot{q}_2 + \frac{\omega_0}{Q}\dot{q}_2 + 2\lambda\Omega_z\dot{q}_1 + \omega_0^2 q_2 = F_2\sin\omega_0 t$$

where $(q_1,q_2)$ are generalized coordinates, $\omega_0$ is the resonance frequency of the mass-spring systems, Q their quality factor, and $\lambda$ a constant that depends on the gyroscope type and on the index of the resonance mode of the device. The steady-state solution to this set of differential equations is found to be $$q_1(t) = \frac{Q}{\omega_0} \frac{\sqrt{(F_1\omega_0)^2 + (2F_2 Q\lambda\Omega_z)^2}}{\omega_0^2 + (2Q\lambda\Omega_z)^2} \sin(\omega_0 t - \theta_1) \quad (B)$$

$$q_2(t) = -\frac{Q}{\omega_0} \frac{\sqrt{(F_2\omega_0)^2 + (2F_1 Q\lambda\Omega_z)^2}}{\omega_0^2 + (2Q\lambda\Omega_z)^2} \cos(\omega_0 t - \theta_2)$$

where $$\theta_1 = \tan^{-1}\frac{2F_2 Q\lambda\Omega_z}{F_1\omega_0} \quad \theta_2 = \tan^{-1}\frac{2F_1 Q\lambda\Omega_z}{F_2\omega_0} \quad (C)$$

The equations above show that the Coriolis force introduces phase delays $\theta_1$ and $\theta_2$ in the gyroscope response. For small values of $\Omega_z$, these phase delays are directly proportional to $\Omega_z$.

In this second analysis the gyroscope is assumed to be fixed in an inertial frame of reference. A sinusoidal excitation is applied to the gyroscope in such a way that the direction of the excitation rotates in the generalized coordinates plane at angular velocity $\Omega_z$. As shown in FIG. 1, a rotating excitation can be generated by applying amplitude-modulated excitations in the direction of the coordinate axes, which correspond to the two resonance modes of the device. Under these assumptions the behavior of the gyroscope is described by the following set of equations:

$$\ddot{q}_1 + \frac{\omega_0}{Q}\dot{q}_1 + \omega_0^2 q_1 = F_0 \cos\Omega_z t \cos\omega_0 t \quad (D)$$

$$\ddot{q}_2 + \frac{\omega_0}{Q}\dot{q}_2 + \omega_0^2 q_2 = F_0 \sin\Omega_z t \cos\omega_0 t$$

The two differential equations are now decoupled, and each can be solved independently of the other. The corresponding solutions can be obtained by exploiting the trigonometric identities:

$$\cos\Omega_z t \cos\omega_0 t = \frac{1}{2}[\cos(\omega_0 + \Omega_z)t + \cos(\omega_0 - \Omega_z)t]$$

$$\sin\Omega_z t \cos\omega_0 t = \frac{1}{2}[\sin(\omega_0 + \Omega_z)t - \sin(\omega_0 - \Omega_z)t]$$

Standard sinusoidal steady-state analysis techniques, the details of which are omitted because of space reasons, can then be used to obtain expressions for the gyroscope response, which is determined by the following transfer function $$H(j\omega) = \omega_0^2 - \omega^2 + j\frac{\omega_0}{Q}\omega$$

Assuming that $|\Omega_z|<<\omega_0$, the following approximate equality holds $$|H[i(\omega_0+\Omega_z)]| \cong |H[j(\omega_0-\Omega_z)]|$$

It can then be shown that the solutions of (D) are given by the following expressions $$q_1(t) = \frac{F_0}{A}\cos(\Omega_z t - \theta_0)\sin\omega_0 t \quad (E)$$

$$q_2(t) = -\frac{F_0}{A}\sin(\Omega_z t - \theta_0)\cos\omega_0 t$$

where $$A = |H[j(\omega_0 + \Omega_z)]| \cong |H[j(\omega_0 - \Omega_z)]| \quad (F)$$

$$\theta_0 = \tan^{-1}\frac{2Q\Omega_z}{\omega_0}$$

Therefore the application of amplitude-modulated excitations to the drive and sense modes of the gyroscope induces a phase shift in the modulating envelope of the gyroscope response. For small values of $\Omega_z$, this phase shift is proportional to $\Omega_z$ through a constant equal to $(2Q/\omega_0)$. Apart from a factor of $\lambda$, this is the same proportionality constant that relates the phase shift in the gyroscope response created by the Coriolis force to the rotation rate $\Omega_z$ (assuming $F_1=F_2$). It follows that a rotating excitation can be substituted for physical rotation for the purpose of calibrating the gyroscope, because for a given type of gyroscope the value of $\lambda$ depends only on the index of the resonance mode of the device.

Since the 2-DOF mass-spring model describes the behavior of a large class of resonating gyroscopes, the results of this analysis are applicable to a wide variety of devices, such as disk, ring, hemispherical shell and mode-matched tuning-fork gyroscopes.

A phase-based readout architecture offers several advantages over the more traditional amplitude-based methods. First, the amplitude of the output signal remains constant, thus minimizing the effect of additive noise. Second, as noted previously herein, rotating excitation induces a phase shift in the responses of the two resonance modes, approximating the effect of physical rotation, and enabling the design of self-calibrating gyroscope architectures that do not require addition of any moving parts to the gyroscope assembly to perform calibration thereof.

Figure 2:
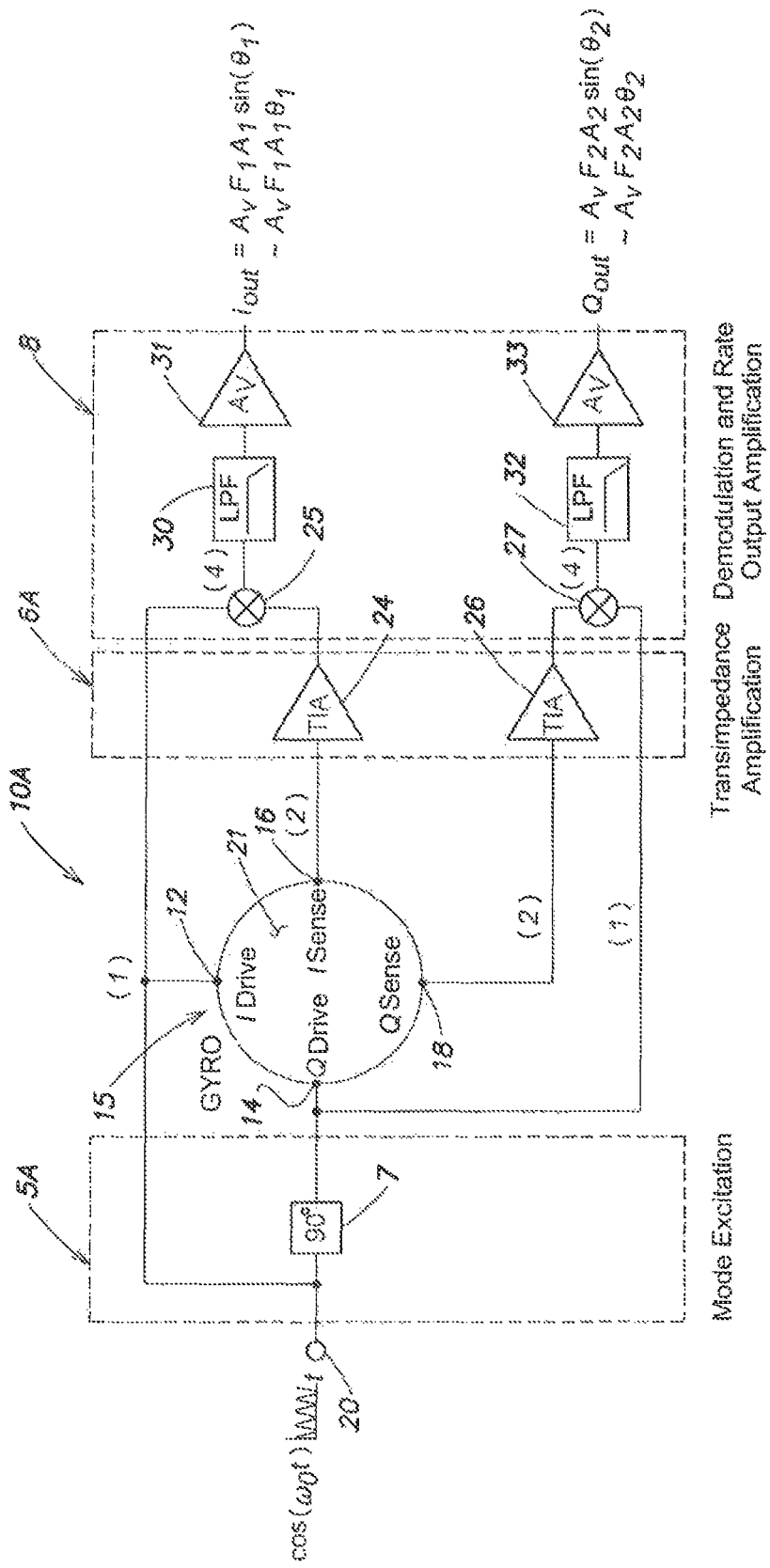
FIG. 2 is a schematic diagram of a gyroscope readout circuit according to the present disclosure.

FIG. 2 illustrates a conceptual schematic block diagram of the phase readout circuit 10A used in conjunction with a gyroscope 15. Gyroscope 15 comprises a resonator body 21 and drive electrodes 12 and 14 and sense electrodes 16 and 18 coupled thereto. It is generally understood that the drive and sense electrodes can be coupled to the resonator body through a number of transduction mechanisms such as capacitive, piezoelectric, piezoresistive, electromagnetic, optical and or thermal. Circuit 10A comprises a mode excitation section 5A, a trans-impedance amplification section 6A, and a demodulation and rate output amplification section 8, as illustrated. Mode excitation section 5A, receives a signal, e.g. a sinusoidal signal, from a signal source coupled to an input node 20 thereof and provides the input signal unprocessed to drive electrode 12 and to signal mixer/multiplier 25 of demodulation and rate amplification section 8. Simultaneously, mode excitation section 5A provides the input signal to a phase shifter element 7, which shifts the phase of the input signal by 90°. The phase-shifted signal is provided simultaneously to drive electrode 14 and to signal mixer/multiplier 27 of demodulation and rate amplification section 8. These drive signals at circuit nodes (1) are applied to the two resonance modes of the gyroscope 15 through the drive electrodes 12 and 14, identified as $I_{Drive}$ and $Q_{Drive}$, respectively. The response of gyroscope 15 at the output terminals of sense electrodes 16 and 18, identified as $I_{Sense}$ and $Q_{sense}$, at circuit nodes (2) are 90° out of phase with each other as well as their respective inputs at circuit nodes (1). The drive and sense signals from each complementary mode are multiplied together, giving the expression set forth in (G) below:

$$I_{mult}(t) = F_1 A_1 \cos(\omega_0 t)\sin(\omega_0 t - \theta_1)$$

$$Q_{mult}(t) = F_2 A_2 \sin(\omega_0 t)\cos(\omega_0 t - \theta_2) \quad (G)$$

where $A_1$ and $A_2$ are the coefficients of the sine and cosine terms in the output signals of electrodes 16 and 18, indicated at the circuit nodes (2). Using trigonometric identities, the expressions in (G) simplify to the expression set forth in (H) below:

$$I_{mult}(t) = \frac{F_1 A_1}{2}[\sin(2\omega_0 t - \theta_1) - \sin\theta_1] \quad (H)$$

$$Q_{mult}(t) = \frac{F_2 A_2}{2}[\sin(2\omega_0 t - \theta_2) + \sin\theta_2]$$

Following the low pass filtering and rate output amplification stages, the frequency components at $2\omega_0$ are removed from the expressions (H), reducing the signal of the phase readout configuration output of FIG. 2 to the expression set forth in (J) below:

$$I_{out}(t) = -\frac{F_1 A_1}{2}\sin\theta_1, \quad Q_{out}(t) = \frac{F_2 A_2}{2}\sin\theta_2 \quad (J)$$

in which $\sin\omega \approx \omega$ for small values of $\theta$.

The unprocessed input signal applied to the drive electrode 12 corresponds to one of the two degenerate resonance modes of the gyroscope (I-mode). The processed signal that is 90° out of phase with the input signal is applied to drive electrode 14 corresponding to the other resonance mode (Q-mode). Two separate amplifiers 24 and 26 forming separate sense channels in the trans-impedance amplification section 6A are used to amplify the I and Q output currents, after which the phase response is extracted through synchronous demodulation in demodulation and rate output amplification section 8. Specifically, utilizing quad multiplier 25, the output of the I-mode was mixed with the unprocessed drive signal of the same mode to generate the following signal:

$$s(t) = A\cos(\omega_0 t)\sin(\omega_0 t - \theta_1)$$

$$= \frac{A}{2}[\sin(2\omega_0 t - \theta_1) - \sin\theta_1]$$

The output of the Q-mode and the 90° phase shifted drive signal was mixed in a similar way utilizing quad multiplier 27. The high-frequency components of each of the output signals of multipliers 25 and 27 were eliminated using low-pass filters 30 and 32, respectively which may be implemented with the configuration of resistive and capacitive elements illustrated in section 8 of FIG. 3. Finally, the remaining signals were amplified using amplifiers 31 and 33, as illustrated. Assuming that $\theta_1$ and $\theta_2$ are sufficiently small, the remaining DC components are proportional to $\Omega_z$ through the proportionality constants given in (C). The linear relationship between phase shift in the gyroscope response and its rotation rate can be verified using ANSYS numerical simulations of actual designs of a bulk acoustic wave (BAW) disk gyroscope and a tuning fork gyroscope. A rate table can be used to provide sinusoidally-varying rotation rates ranging from zero to 175°/s.

A BAW disk gyroscope suitable for use with the disclosed system is described in commonly assigned U.S. Pat. No. 7,543,496. Another BAW gyroscope which may be used in association with the readout and calibration circuitry disclosed herein typically comprises a center-supported disk structure with capacitively-coupled drive, sense and control electrodes with an in-plane resonance mode of index n=3 since the two degenerate resonance modes with this index are spatially 30° apart and therefore have the same resonance frequency. Similarly, a tuning fork gyroscope suitable for use with the disclosed system is described in commonly assigned U.S. Pat. No. 7,043,985. It will be obvious to those reasonably skilled in the arts that other gyroscope designs, including ring, hemispherical shell and mode-matched tuning-fork gyroscopes, may likewise be utilized with the phase shift readout and solve calibration architecture and techniques disclosed herein.

Figure 3:
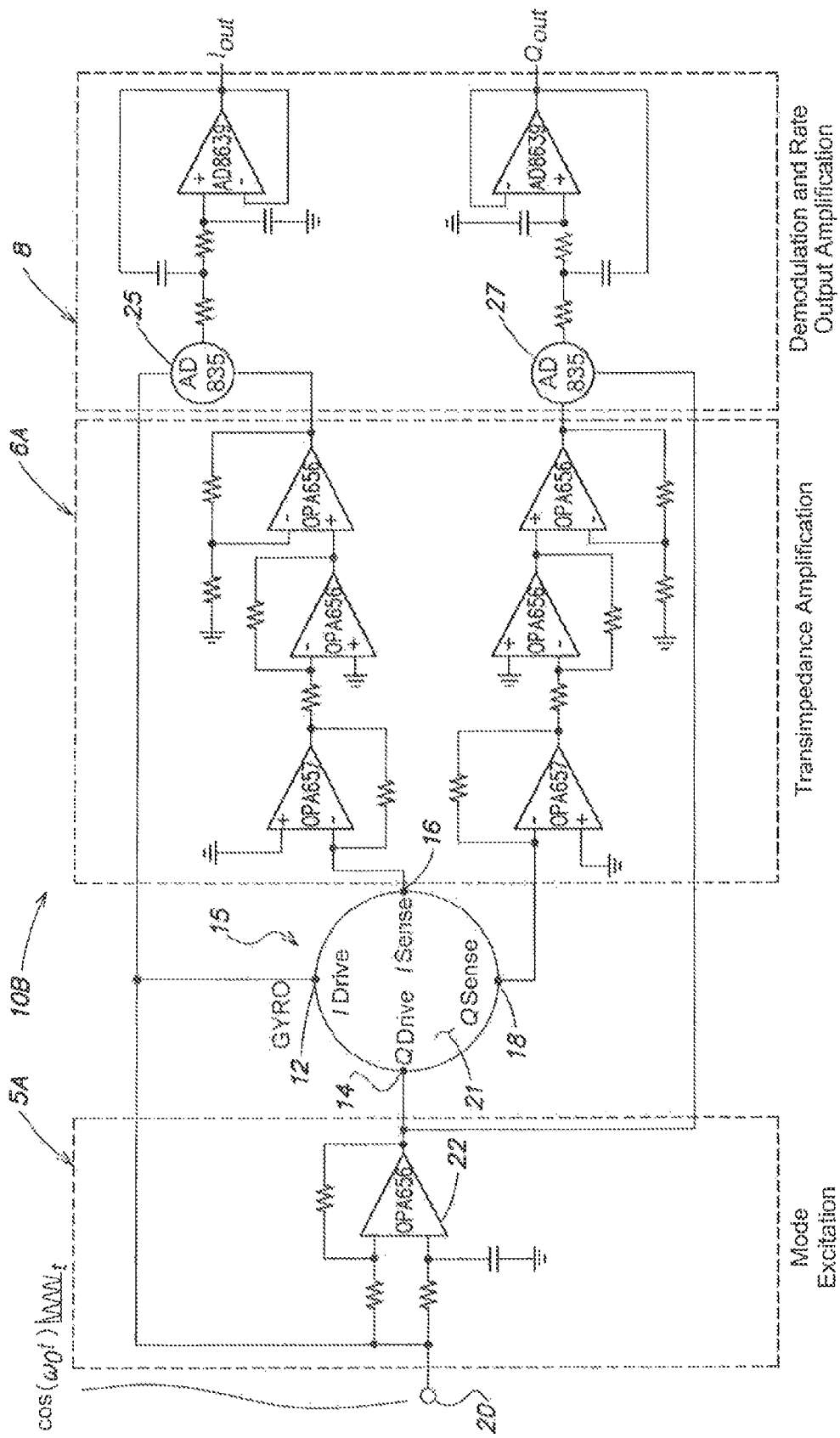
FIG. 3 is a schematic diagram of an implementation of the readout circuit of FIG. 2 according the present disclosure.

FIG. 3 illustrates a phase shift readout circuit 10B that is conceptually similar in design function to phase shift readout circuit 10A of FIG. 2, but implemented with a plurality of commercially available electronic components depending on the gyroscope implementation. In circuit 10B, phase shifter 7 of mode excitation section 5A may be implemented using a discrete op-amp 22 in conjunction with resistive and capacitive elements, as illustrated, to generate the 90° phase shift for the Q-mode excitation signal. In the illustrative embodiment, op-amp 22 may be implemented with any number of commercially available operational amplifiers including (but not limited to) the model TI OPA656, commercially available from Texas Instruments, Dallas, Tex.

In circuit 10B, separate trans-impedance amplifier chains 24 and 26 are utilized to implement trans-impedance amplification section 6A, which reads the I-mode and Q-mode sense signals, respectively. Trans-impedance amplifier chains 24 and 26 of FIG. 2 may be implemented in FIG. 3 may be implemented with a plurality of operational amplifiers and associated resistive elements in the configuration illustrated in FIG. 3. For example, model TI OPA657 operational amplifiers commercially available from Texas Instruments are used at the sense channel input to provide current-to-voltage conversion and amplification of the phase-shifted signal. Each signal chain is then passed to two voltage amplifiers, which may be implemented with model TI OPA656 operational amplifiers, to provide additional amplification and buffering for the mixers/multiplier stages 25 and 27, which may be implemented with quad-multiplier model AD835, commercially available from Analog Devices, Inc., Wilmington, Mass. For the $M^2$-TFG gyroscope, model TI OPA656 operational amplifiers may be used at the sense channel input to provide current-to-voltage conversion and amplification of the phase-shifted signal to provide higher gain and lower bandwidth than the TI OPA657.

In experimental results, utilizing the circuit of FIG. 3 with a BAW disk gyroscope, sinusoidally-varying rotation rates ranging from 0 to 10°/s were applied via a rate table. Consequently, the output signals denoted as $I_{out}$ and $Q_{out}$ in FIG. 3 were also observed to be sinusoids with amplitudes proportional to the applied rotation rate. At the applied rates, it was derived that $\theta_1$ and $\theta_2$ would remain small enough to satisfy equation (F). The BAW gyroscope was tested with an input power of 0 dBm applied to the $I_{Drive}$ and $Q_{Drive}$ terminals of the device. The measured data points were closely aligned along a straight line with a slope of 0.6 mV/°/s. The linearity of the collected measurements confirms the response predicted by the theoretical calculations and numerical simulations.

Measurements were also taken on the $M^2$-TFG gyroscope using applied rotation rates from 0 to 10°/s; however, the applied input power was reduced to −4 dBm to prevent the device from saturating. The scale factor measurements showed a device sensitivity 0.15 mV/°/s. Like the BAW gyroscope, the $M^2$-TFG gyroscope also exhibited a very linear response to the input excitation. Table 1 summarizes the simulated and measured performance parameters of both gyroscopes.

TABLE 1

|  | BAW | $M^2$-TFG |
| --- | --- | --- |
|  | SIMULATION | |
| Q (simulated) | 20,000 | 50,000 |
| $f_0$ (simulated) | 10 MHz | 5.95 kHz |
| Phase Sensitivity | $3.9 \times 10^{-4}$°/(°/s) | 2.51°/(°/s) |
|  | MEASUREMENT | |
| Q | 32,000 | 60,000 |
| $f_0$ | 9.65 MHz | 11.7 kHz |
| Excitation Power | 0 dBm | −4 dBm |
| Sensitivity | 0.597 mV/(°/s) | 0.148 mV/(°/s) |

Figure 4:
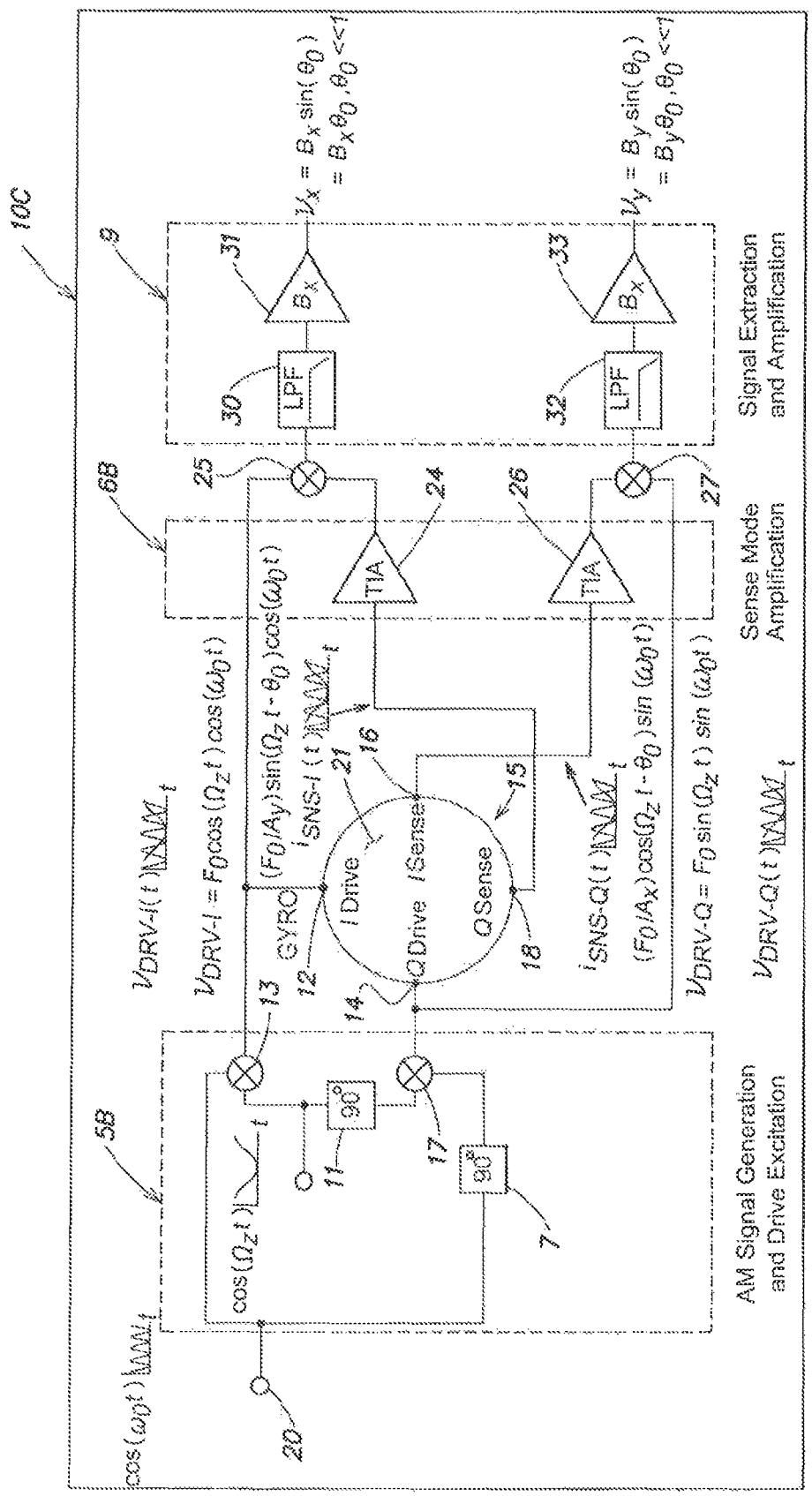
FIG. 4 is a schematic diagram of a gyroscope readout and self-calibration circuit according to the present disclosure.

FIG. 4 is a schematic diagram of a gyroscope readout and self-calibration circuit according to the present disclosure. FIG. 4 illustrates a phase shift readout and self-calibration circuit 10C which is conceptually similar in design function to phase shift readout circuit 10A of FIG. 2, but with the addition of circuit components which enable the self-calibration of the gyroscope. An equivalent rate of rotation is detected utilizing the techniques and readout architecture disclosed herein. Specifically, circuit 10B comprises a signal generation and drive excitation section 5B, a sense mode amplification section 6B, and a signal extraction and amplification section 9, as illustrated. Mode excitation section 5B is similar to both excitation sections 5A of FIG. 2 and FIG. 3 with the addition of a second phase shift element 11 and a pair of quad multipliers 13 and 17 in the configuration is illustrated, which enable a calibration signal to be added through a second input node to both electrodes 12 and 14 with a 90° phase differential. Sense mode amplification section 6B, may be similar in construction and function to trans-impedance amplification section 6A, described previously herein. Similarly, signal extraction and amplification section 9 may be similar in construction and function to the demodulation and rate amplification section 8, described previously herein. Note that in circuit 10C, the output of sense electrode 18 is coupled to amplifier 24 of amplification section 6B while the output of sense electrode 16 is coupled to amplifier 26.

A rotating electrostatic field can be created by applying to the gyroscope electrodes aligned with the drive and sense modes an amplitude-modulated excitation according to the expressions given in (D). More specifically, to generate a gyroscope phase-shift response to a rotating excitation, a low-frequency sinusoidal signal may be applied to the phase shifter 11 to generate in-phase and quadrature (90° out of phase) components of the rotation excitation. Both signals are independently mixed with a sinusoidal signal operating at the resonance frequency of the gyroscope 15 to create the amplitude-modulated excitation sinusoids used to excite the I and Q drive electrodes, according to the expressions in (D). The phases of the output currents of the sense electrodes may be utilized to measure the modulating angular frequency $\omega_z$, which mimics the gyroscope rotation rate.

The reader will appreciate that the phase-shift readout configuration disclosed herein is an effective method of measuring the rotation rate of mode-matched gyroscopes, e.g. high-frequency (BAW) gyroscope and low-frequency mode-matched tuning fork ($M^2$-TFG) or ring gyroscopes, and can be applied to other gyroscope designs and can be implemented without the need for rotary stage that physically rotates the gyroscope for proper operation.

The present disclosure is illustratively described above in reference to the disclosed embodiments. Various modifications and changes may be made to the disclosed embodiments by persons skilled in the art without departing from the scope of the present disclosure as defined in the appended claims.

What is claimed is:

1. A gyroscope apparatus comprising:
   a resonator body; and
   a self-calibration mechanism comprising interface circuitry for applying a rotating electrostatic field to a first drive electrode and a second drive electrode simultaneously.

2. The apparatus of claim 1 wherein the first and second drive electrodes are operatively coupled to the resonator body.

3. The apparatus of claim 1, wherein the interface circuitry comprises:
   circuitry for providing a first drive signal to the first drive electrode; and
   circuitry for simultaneously providing a second drive signal to the second drive electrode, the second drive signal having a phase difference with the first drive signal.

4. The apparatus of claim 3, wherein the second drive signal has a 90° phase difference with the first drive signal.

5. A gyroscope apparatus comprising:
   a resonator body; and
   a self-calibration mechanism for applying a rotating electrostatic field to the resonator body.

6. The apparatus of claim 5 wherein the self-calibration mechanism comprises:
   circuitry for providing a first drive signal to a first drive electrode; and
   circuitry for simultaneously providing a second drive signal to a second drive electrode, the second drive signal having a phase difference with the first drive signal.

7. The apparatus of claim 6 wherein the second drive signal has a 90° phase difference with the first drive signal.

8. The apparatus of claim 6 wherein the first and second drive electrodes are operatively coupled to the resonator body.

\* \* \* \* \*